Jan. 5, 1960 J. R. NEWTON ET AL 2,919,758
KNOCKDOWN POWERED GOLFING CART
Filed Aug. 5, 1955 3 Sheets-Sheet 1

INVENTORS
John R. Newton
Archie L. Porter Jr.
BY
Stuhlwell
Atty.

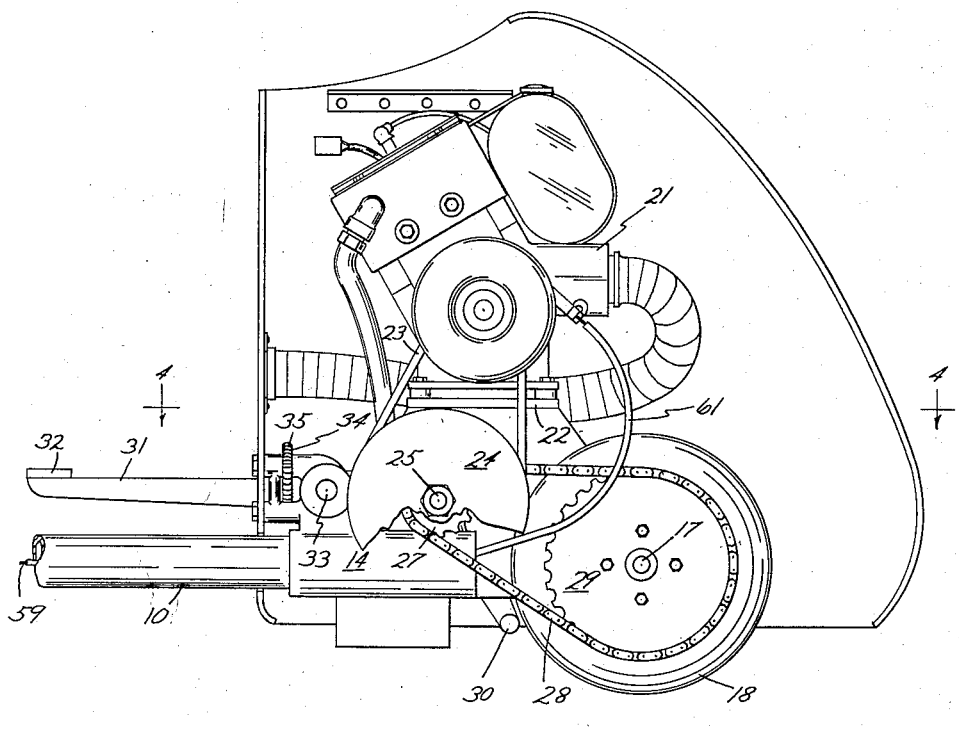
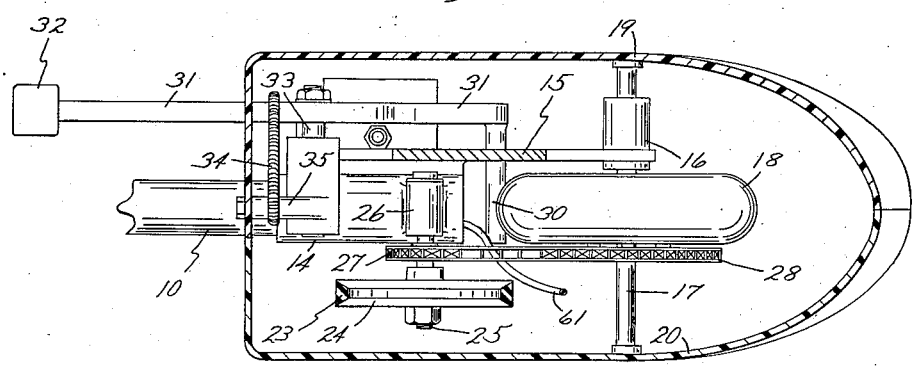

Jan. 5, 1960  J. R. NEWTON ET AL  2,919,758
KNOCKDOWN POWERED GOLFING CART
Filed Aug. 5, 1955  3 Sheets-Sheet 3
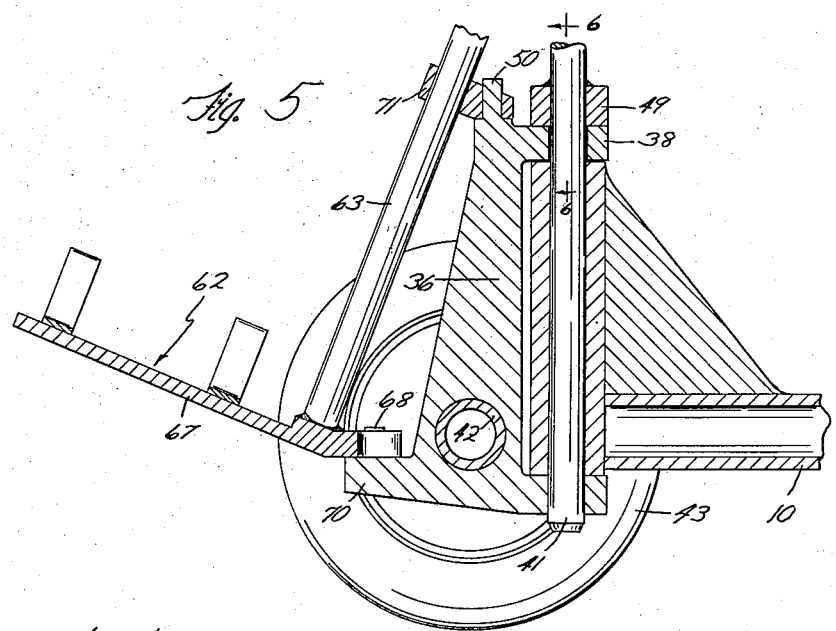
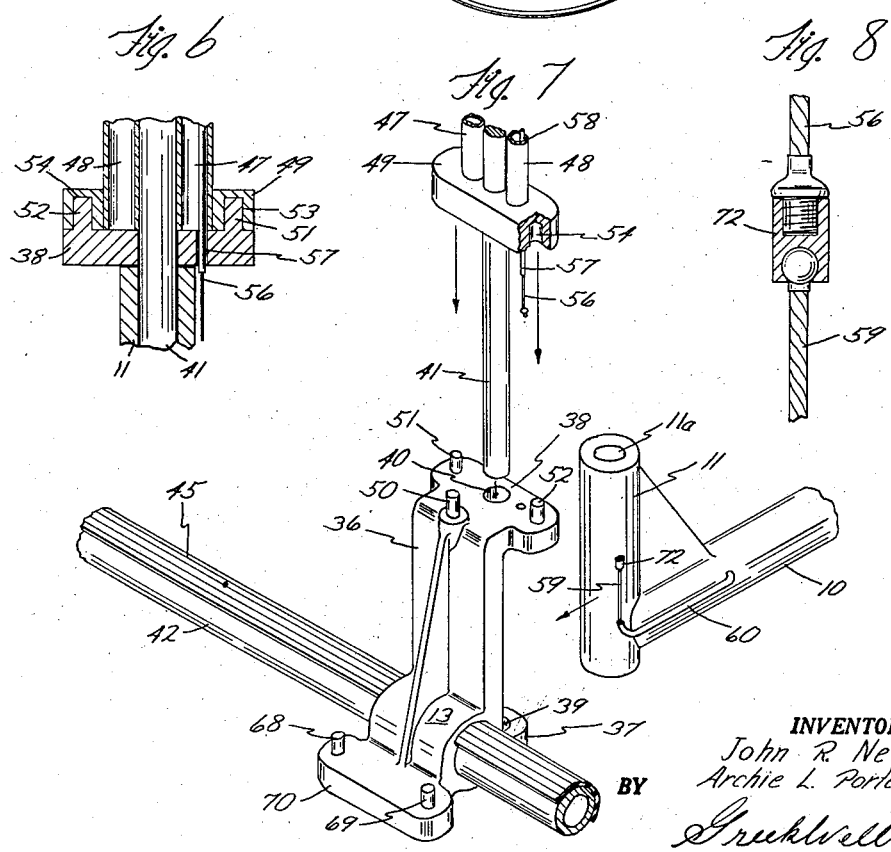
INVENTOR.
John R. Newton
Archie L. Porter Jr.
BY
Gruehlwells
Atty.

United States Patent Office 2,919,758
Patented Jan. 5, 1960

2,919,758

KNOCKDOWN POWERED GOLFING CART

John R. Newton and Archie L. Porter, Jr., Vancouver, Wash.

Application August 5, 1955, Serial No. 526,676

2 Claims. (Cl. 180—25)

The present invention relates to a powered golfing cart. It is the principal purpose of our invention to provide a simple three wheeled cart which is powered by a small motor and which can be quickly dismantled by the user into easily lifted parts, consisting of a golf bag holder, a handle bar unit, a front wheel unit and a rear wheel-motor unit. There are a number of self powered vehicles now being used on the golf course to enable those who cannot do the amount of walking that is necessary to go around a regular course, to play the game and ride between shots. These machines with which we are familiar, however, do not lend themselves readily to being transported by the golfer in his car or to be handled and lifted around by one individual. Our invention is embodied in a self powered golfing cart which is readily broken down into component parts that are easily lifted and stored in an automobile trunk compartment. The entire machine when assembled, is capable of carrying an individual golfer and yet is light enough that it can be easily packed up or moved over obstructions without undue exertion.

The nature and advantages of our invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Figure 3 is an enlarged side view of the rear end of the machine with the cover removed to show the motor and drive construction;

Figure 4 is a sectional view taken on the line 4—4 of Figure 3;

Figure 5 is an enlarged sectional view taken on the line 5—5 of Figure 2;

Figure 6 is a fragmentary sectional view taken on the line 6—6 of Figure 5;

Figure 7 is an exploded view showing the front axle-handle bar assemblies being separated from the main frame of the machine; and Figure 8 is a greatly enlarged detailed view of the gas control coupling.

Figure 1:
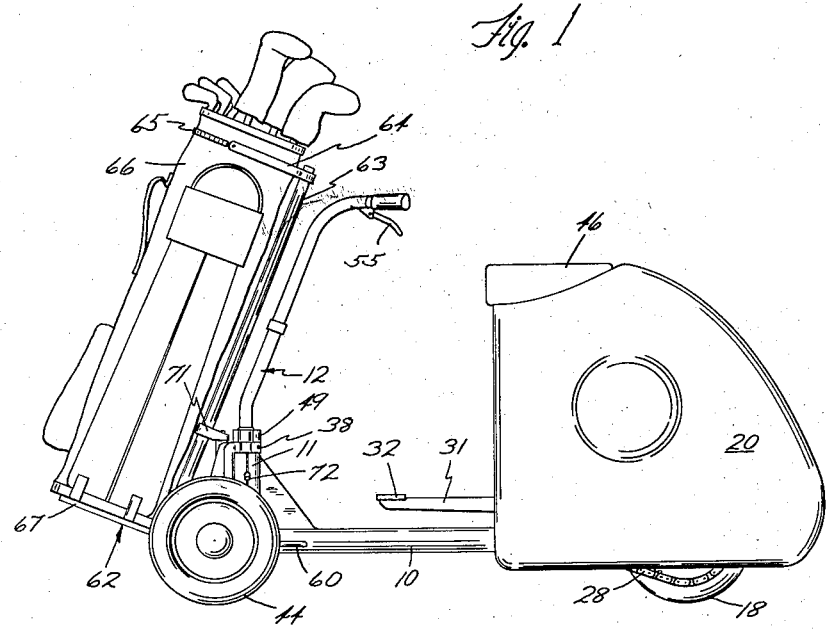
Figure 1 is a view in side elevation of a powered golfing cart embodying our invention.
Figure 2:
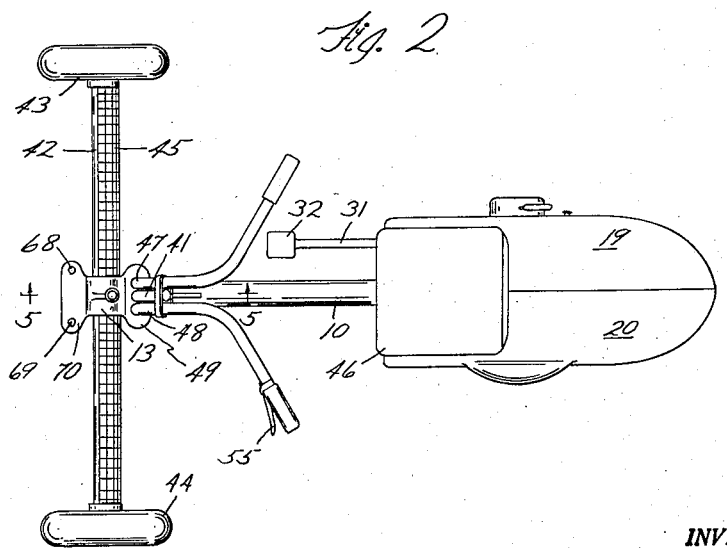
Figure 2 is a plan view of the cart with the bag holder removed therefrom.

Referring now in detail to the drawings our powered golfing cart is illustrated as having a main longitudinal frame 10 which is aluminum tubing provided at its front end with a vertical tubular bracket 11 for mounting the handle bar and front axle assemblies 12 and 13. At its rear end the frame member 10 has a motor mounting block 14. The motor mounting block includes an upright standard 15 offset laterally from the frame 10 and extending rearwardly and downwardly to provide a support bearing 16 for a rear axle 17 that mounts a drive wheel 18. Two hood sections 19 and 20 are mounted on the axle 17 and the front end of the block 14 to enclose a motor 21 which is mounted on a horizontally running platform 22 at the top of the member 15. The motor 21 is a small industrial type internal combustion motor. It drives a belt 23 that in turn drives a pulley 24 that is mounted on a shaft 25 journalled in a bearing 26 on the block 14. The shaft 25 has a sprocket wheel 27 thereon which is connected by a drive chain 28 to a larger sprocket wheel 29 that is bolted to the wheel 18. The wheel 18 is journalled on the axle 17. It is a pneumatic wheel with a suitable traction tread.

A simple braking mechanism is provided for applying a braking force to the wheel 18. This mechanism comprises a brake bar 30 which is adapted to engage the surface of the wheel 18. The bar 30 is affixed to one end of a lever 31, the other end of which has a foot pedal 32 thereon slightly above and one side of the frame member 10. The lever 31 is pivoted on a stub shaft 33 that is provided at the front end of the block 14. The lever 31 is held in brake release position by a coil spring 34 that is wrapped around the forwardly extending part of the lever 31 and around a projection 35 of the block 14.

The front wheel assembly 13 is composed of a bracket 36 which has a bottom lug 37 that fits beneath the bracket 11 and a top lug 38 that fits over the bracket 11. The two lugs 37 and 38 are provided with apertures 39 and 40 which are adapted to align with the aperture 11a of the bracket 11 and receive a depending rod 41 which is part of the handle bar assembly 12. The rod 41 couples the brackets 11 and 36 together so that the bracket 36 can pivot on the bracket 11.

The bracket 36 carries an axle 42 which mounts two front wheels 43 and 44 by means of suitable ball bearings. The front wheels 43 and 44 are pneumatic wheels which serve to support the front end of the cart. A rubber foot piece 45 is provided on the axle 42 for the front feet of the rider of the vehicle. A padded seat 46 is provided at the top forward portions of the hood sections 19 and 20 for the rider. The handle bar unit of the device embodies the rod 41 and two handle bar tubes 47 and 48, all of which are mounted in a block 49 which is adapted to rest upon the lug 38. The bracket 36 has three upstanding pins 50, 51 and 52 thereon. The pins 51 and 52 extend into sockets 53 and 54 that are provided in the under face of the block 49. The one handle bar 48 carries a gas feed control lever 55 which is adapted to operate a flexible wire 56 that extends down through the handle bar 48 and through an aperture 57 in the block 49. The flexible wire 56 is housed in a flexible tubing 58 and is coupled to another flexible wire 59 by the manuable releasable coupling which is illustrated in Figure 8 of the drawings. The wire 59 extends through a tube 60 into the tubular main frame 10 and rearwardly through the block 14 and a tube 61 to the motor 21. This control system for controlling the gas feed of the motor 21 is essentially a standard piece of equipment except for the releasable connection illustrated in Figure 8, which is necessary for separating the handle bar unit from the bracket 36 and the frame 10.

A golf bag support 62 is also mounted by a bracket 36. This golf bag support comprises a tube 63 provided with a semicircular yoke 64 at the top and a spring 65 for encircling the top of a golf bag 66. At the bottom of the tube 63 a plate 67 is provided for the bottom of the golf bag to rest upon. The plate 67 has two apertures in it to receive pins 68 and 69 which are provided on a foot piece 70 of the bracket 36. The tube 63 also carries a block 71 which is apertured to receive the pin 50.

The construction just described provides a golfing cart in which the golf bag 66 with its support 62 can be readily lifted off of the bracket 36 to provide one unit of the assembly. The handle bar unit 12 and the front wheel assembly unit 13, including the bracket 36, are separated from the main frame 10 by releasing the coupling 72 for the gas feed control cable 59 and merely lifting the rod 41 out of the apertures 11a, 39 and 40. This provides the operator of the golf cart with the golf bag and its support as a single unit to pack away, the wheels 43 and 44, the front axle 42 and the bracket 36 is a second single unit which can be readily stored away. The handle bars provide a third unit and the major unit is, of course, the frame 10 with the motor and the rear wheel assembly.

Having thus described our invention, we claim:

1. A powered golfing cart comprising a longitudinal frame member, a driving wheel mounted at the rear of said frame member, a power plant mounted on said frame member adjacent the driving wheel and drivingly connected to the wheel, a hood supported on the frame member and covering the power plant, said hood having a seat thereon, a front axle unit having wheels rotatably mounted thereon, a bracket secured to the center of said axle, said bracket having rearwardly extending vertically spaced lugs thereon, said lugs having vertically aligned apertures therein, a vertical tubular bracket secured to the forward end of the frame member, said tubular bracket positioned between said vertically spaced lugs and being vertically aligned with the apertures in said lugs, a handle bar unit having a vertical rod at the lower end thereof, said rod extending through the apertures in the lugs on the bracket and extending through the vertical tubular bracket positioned between the lugs whereby to pivotally secure the frame member to the axle unit, said handle bar unit having a block secured thereon and positioned above the upper lug on the bracket, said block having sockets therein and said upper lug having pins thereon seating in said sockets whereby to secure said handle bar unit against rotation with relation to said axle unit, and a golf bag holder separably secured to said bracket in front of the axle.

2. A powered golfing cart comprising a powered rear wheel unit having a forwardly extending frame member, a front axle member having supporting wheels thereon, and a handle bar unit, said forwardly extending frame member having a vertical tubular bracket member secured to its front end, said front axle member having a bracket secured at its center, said bracket having vertically spaced rearwardly extending lugs thereon positioned above and below the tubular bracket member, vertically aligned apertures in said lugs, said handle bar unit having a depending rod secured to its lower end, said rod extending through the apertures in the lugs and through the tubular bracket member pivotally securing the front axle to the rear wheel unit, the upper lug on the bracket having a pair of transversely spaced vertical pins thereon, the handle bar unit having a block secured thereon above the depending rod, said block having sockets therein receiving said pins and securing the handle bar unit against rotation with respect to the axle member.

References Cited in the file of this patent

UNITED STATES PATENTS

| | | |
|---|---|---|
| 623,144 | Dunsworth | Apr. 18, 1899 |
| 679,561 | Hircock | July 30, 1901 |
| 2,463,972 | Jackson | Mar. 8, 1949 |